United States Patent [19]

Heindl et al.

[11] Patent Number: 5,585,126
[45] Date of Patent: Dec. 17, 1996

[54] CLOSING UNIT FOR FORM TOOLS OF AN INJECTION MOLDING MACHINE

[75] Inventors: Friedrich Heindl, deceased, late of Baden, by Annemarie Heindl, heiress; Harald Bleier, Wr. Neustadt, both of Austria

[73] Assignee: Battenfeld Kunststoffmaschinen Ges.m.b.H., Kottingbrunn, Austria

[21] Appl. No.: 387,938

[22] PCT Filed: Aug. 21, 1993

[86] PCT No.: PCT/EP93/02256

§ 371 Date: Apr. 7, 1995

§ 102(e) Date: Apr. 7, 1995

[87] PCT Pub. No.: WO94/04337

PCT Pub. Date: Mar. 3, 1994

[30] Foreign Application Priority Data

Aug. 25, 1992 [DE] Germany ............... 42 28 139.3
Dec. 11, 1992 [DE] Germany ............... 42 41 820.8

[51] Int. Cl.⁶ ............................................. B29C 45/64
[52] U.S. Cl. ........................ 425/589; 425/592; 425/593
[58] Field of Search ............................ 425/145, 589, 425/592, 593

[56] References Cited

U.S. PATENT DOCUMENTS 5,102,327  4/1992  Reinhart .................. 425/590
5,176,923  1/1993  Ito ............................ 425/150
5,362,222  11/1994 Faig et al. ................. 425/145
5,417,558  5/1995  Heindel et al. ........... 425/145

FOREIGN PATENT DOCUMENTS 164419  12/1985  European Pat. Off.
364607   4/1990  European Pat. Off.

Primary Examiner—Tim Heitbrink
Attorney, Agent, or Firm—Anderson, Kill & Olick, P.C.

[57] ABSTRACT

A closing unit 1 for mold tools 6 of injection molding machines is provided with a stationary mold support- or base-plate 2, a mold support plate 3 whose spacing can be adjusted relative to the stationary mold support plate by displacement thereof, as well as a drive support plate 4, which is connected to the stationary mold support- or base plate 2 by traction links 5, for instance struts. The traction links 5 can be used at the same time as slide guides for the mobile mold support plate 3 and an electromotor 8 serves as an actuation device for the mobile mold mounting plate 3, which electromotor 18 repositions one or several toggle levers 6 and 7 alternately between a kinked position and a stretched position. The toggle lever system or systems are installed between the drive support plate 4 and the mobile mold molding plate 3 and the mold tool 6 is maintained under closing stress or tension between the two mold support plates 2 and 3 in the stretched position of the toggle lever system or systems 7.

9 Claims, 2 Drawing Sheets

CLOSING UNIT FOR FORM TOOLS OF AN INJECTION MOLDING MACHINE

BACKGROUND OF THE INVENTION

The invention deals with a closing unit for form or mold tools of injection molding machines with a stationary mold support- or base plate, a mold support plate whose spacing relative to the stationary mold support plate can be changed by displacement, as well as a drive support plate, which is connected to the stationary mold support- or base plate by traction links, for instance struts, which can simultaneously be used as a slide guidance for the mobile mold support plate. An electromotor is used as an actuation or control drive for the mobile mold mounting plate, which can be alternatingly repositioned between a folded or kinked state and a stretched state by means of a threaded spindle and one or several toggle lever systems, which toggle lever system or systems are installed between the drive support plate and the mobile mold mounting plate, and this indeed in such a way that the molding tool is retained under closing tension between the two mold carrier plates in the stretched position of the toggle lever system or systems.

A closing unit of this known type is for instance disclosed in the EP-A1 0 164 419. The particularity of this known closing device consists in that the electric servomotor serving as an actuation drive for the mobile mold mounting plate is to be operated in the stretched position of the toggle lever system or systems by a current, which is lower than the normal working current. Solely by means of this, thus without using stops, the stretched position of the toggle lever system or systems holding the molding tool between the two mold carrier plates under closing tension is to be assured in this state of the art. In the known closing unit it is however not only disadvantageous, that the electric servomotor has to carry current also in the stretched position of the toggle lever system or systems, even if it is only a reduced current. Rather discrepancies arise therefrom, in that the electric servomotor and/or the toggle lever system or systems actuated by said motor as force transmittal mechanism must be given an unsymmetrical arrangement relative to the closure unit.

SUMMARY OF THE INVENTION

In order to eliminate this shortcoming in state of the art closure units, the invention provides, that a liquid-cooled servomotor be used as electric motor in particular an AC synchronous motor, having a hollow shaft, within which the threaded spindle is axially displaceable by means of a nut, which spindle engages at the toggle lever system or systems in a non-rotatable manner thereto.

The advantage of this configuration of a closure unit is, that its entire drive- and force-transmittal system can be built up in a flush position with or symmetrically to the force axis of same and therefore can be laid out in a very compact manner.

The use of a liquid-cooled electric servomotor is not only of advantage because same can be given a minimum constructional size, rather it is also significant, that during stoppages very high torques can be generated herein, by means of which the stretched position of the toggle lever system against stationary stops can be optimally secured. The heat energy dissipated from the electric servomotor by the water as a cooling agent can be recovered and subsequently made use of for instance for tool tempering or heat treatment. Thus an increase of the overall efficiency of the injection molding machine or a saving of energy costs is achieved.

The proposal in the invention has also proved itself, to couple the nut allocated to the threaded spindle within the drive support plate to the hollow shaft of the servomotor. It has also proved itself to connect the threaded spindle with a crosshead engaging at one or a plurality of toggle lever systems so as to be non-rotatable thereto.

Closure units of this generic type are as a rule equipped with a device for tool installation height change allocated to the two mold support plates. This means, that adjustment devices exist, by means of which the spacing between the stationary mold support- or base-plate and the displaceable mold support plate can be varied without being affected by the toggle lever systems used as force transmittal mechanism. It is further important according to the invention for such a structure, to provide an electromotor as drive of the tool installation height adjustment device, which sits on the drive support plate in addition to driving a spur wheel also supported on said plate, which wheel again meshes with pinions, wherein one each pinion is coupled with respectively one nut supported at the drive support plate so as to be axially non-displaceable however rotatable; said nut is in engagement with a thread of one each traction link (strut) provided between the stationary mold support- or base-plate and the drive support plate. It is also of essential significance for a closure unit laid out in such a way, that the drive system and the associated force transmittal mechanism can be arranged to be in flush position or symmetrically to the force axis of the closing unit in order to exert a closing tension upon the mold tool; namely only thereby has the installation space for the tool installation height adjustment device on a drive support plate of normal size become available.

A particularly effective layout is given to the tool installation height adjustment device, if the electric motor is equipped as a spur wheel transmission motor as well as (in addition) being provided with a holding brake.

Finally an essential embodiment measure also based upon the spur wheel of the tool installation height displacement device being formed by a ring, which is supported at the drive support plate by means of flanged or guide rollers engaging at its internal circumference. Herein there results a particularly advantageous possibility in that the drive system serving for opening and closing the molding tool as well as for generation of the closing stress or tension of same and the tool installation height adjustment device can, without mutual or reciprocal interference, be installed, removed, repaired, replaced, and maintained at the drive support plate of the closure unit. The side by side or interpenetrating disposition of the drive system for opening and closing the molding tool as well as the tool installation height adjustment device at the drive support plate of the closing unit requires no more installation space in the invention, than is necessary in the state of the art solely for the drive of the mold tool opening and closing system.

BRIEF DESCRIPTION OF THE DRAWINGS

An embodiment example of the subject in the invention is shown on the drawing. Herein it is shown on.

DETAILED DESCRIPTION OF THE PREFERRED EMBODIMENT

Figure 1:
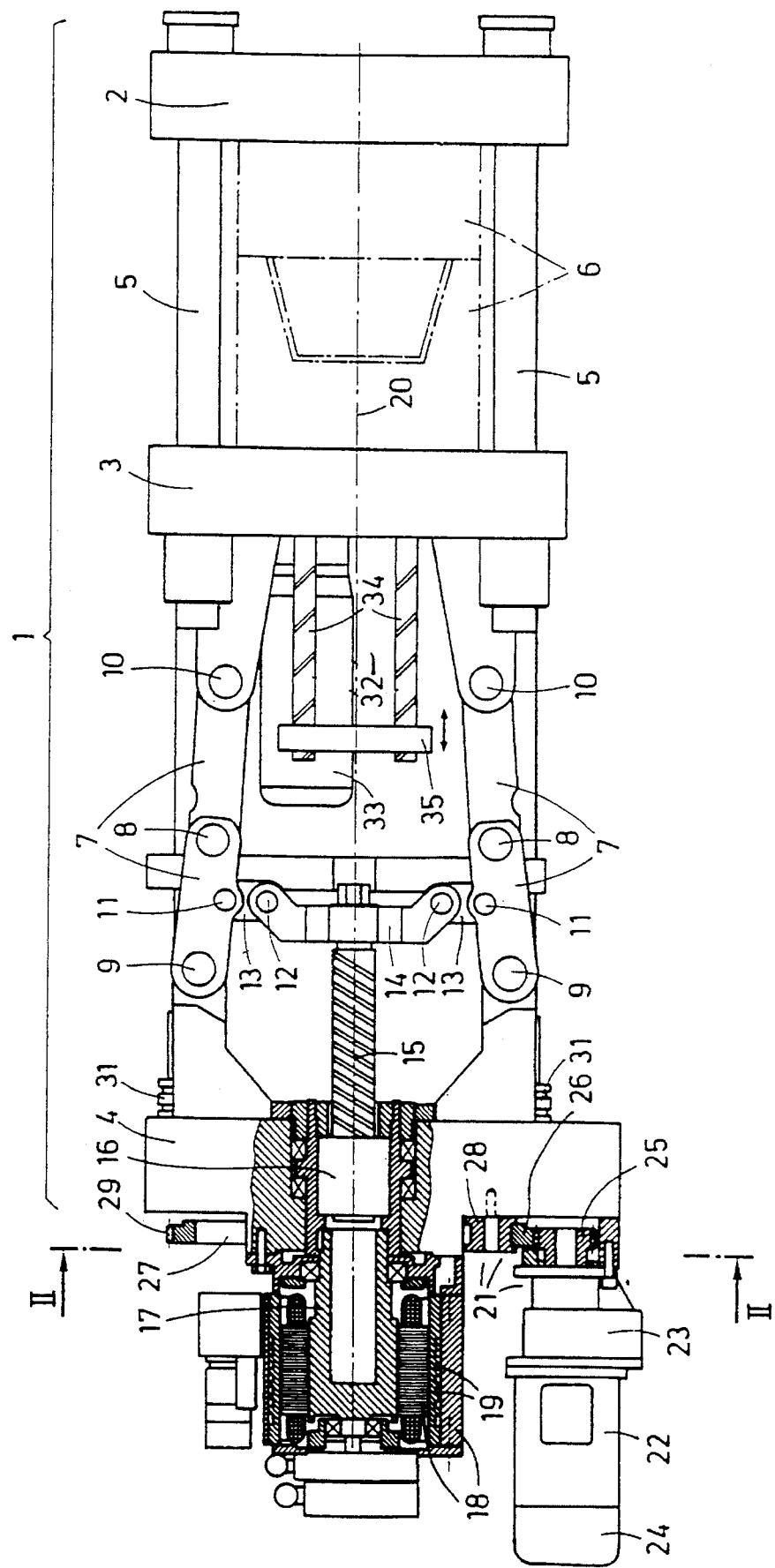
FIG. 1 a closing unit for molding tools of injection molding machines partially in side view and partially in longitudinal section and FIG. 2 a front view upon the closing unit in FIG. 1 approximately in the there outlined plane II—II shown diagrammatically in a simplified presentation.
Figure 2:
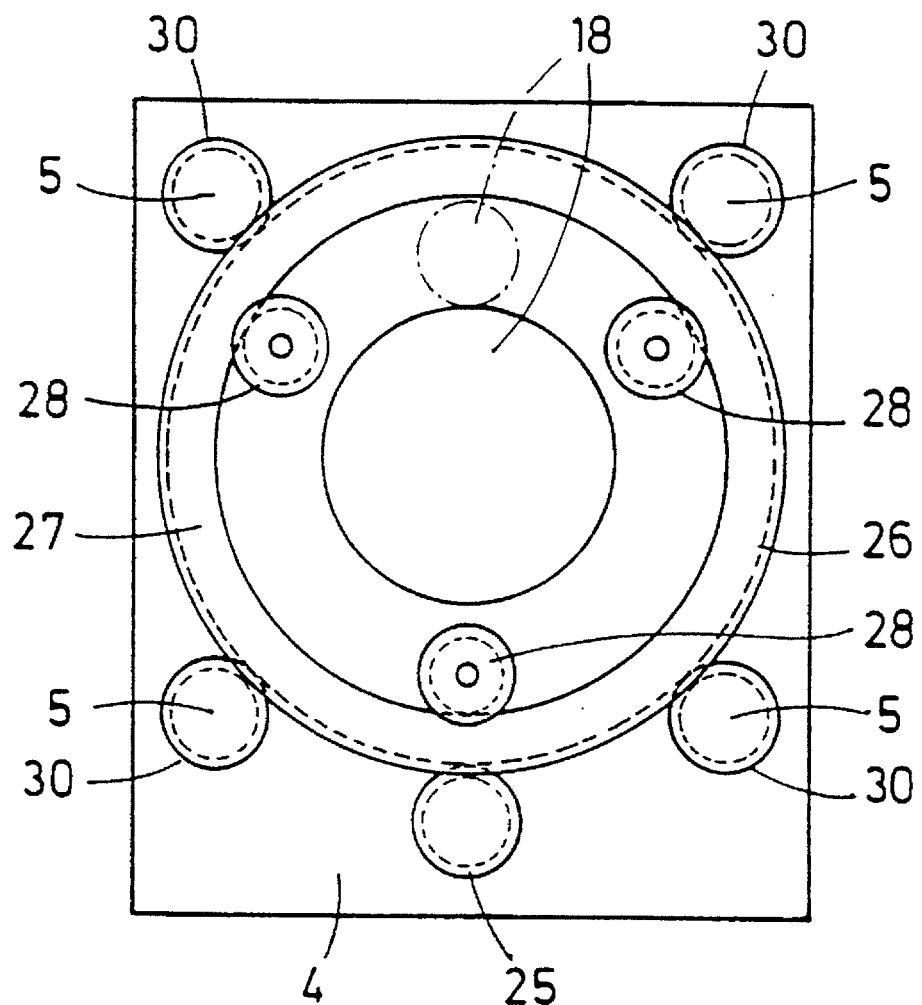

A closing unit 1 for molding tools of injection molding machines can be seen in FIG. 1 of the drawing, which comprises a stationary mold support- or base-plate 2, a mold support plate 3 whose spacing can be changed relative to the stationary plate by displacement, as well as a drive support plate 4. The drive support plate 4 is herein connected with the stationary mold support- or base-plate 2 by several parallel traction links 5 formed, e.g., as struts. In the embodiment shown in the drawings, there are provided four struts of which only two are depicted in FIG. 1, however all four can be seen in FIG. 2. The traction links 5 can at the same time be also utilized as a slide guidance for the mold support plate 3 whose spacing can be varied relative to the stationary mold support- or base-plate 2.

Toggle lever systems 7, which are installed between the mobile mold support plate 3 and the drive support plate 4, serve as force transmittal mechanisms for the spacing adjustment of the mobile mold mounting plate 3 relative to the stationary mold support- or base-plate 2 for the purpose of opening and closing of the molding tool 6, outlined only by the dash-dotted line in FIG. 1, as well as for maintaining of its closing stress or tension.

In the embodiment example of a closing unit 1 as shown in FIG. 1, the toggle lever systems 7 are constructed as respectively so-called five point toggle lever systems, which in addition to the toggle joint 8 and the two end joints 9 and 10 comprise two additional joints 11 and 12, which belong to a connecting side bar 13, by means of which all of the toggle lever systems 7 are coupled to a common crosshead. A threaded spindle 15 engages at the crosshead 14 nonrotatably thereto or rotationally secured thereto, which is meshing with a nut 16 which is received in the drive support plate 4 to be axially non-displaceable however rotationally drivable. The nut 16 is coupled to the hollow shaft 17 of an electromotor 18 for the purpose of its being driven, which motor is flanged to the external side of the drive support plate 4; herein its hollow shaft 17 has such internal dimensions, that said shaft is able to house without any problems the length of the threaded spindle 15 which can be screwed out from the nut 16 in the rearward direction. The electromotor 18 is configured in particular as an AC-synchronous motor or also as a three phase synchronous motor, as well as being provided with liquid cooling 19, so that it can be given a compact type of construction in spite of its high power output density.

It can be easily seen from FIG. 1 of the drawing, that the toggle lever systems 7 are positioned to be symmetrical to the force axis 20 of the closing unit 1 and that the threaded spindle 15, the nut 16 and the electromotor 18 with its hollow shaft 17 are disposed flush with the force axis 20 of the closing unit 1. The closing unit therefore has a very compact type of construction accompanied by an optimum working or operating mode.

Closing units 1, which use toggle lever systems 7 as force transmittal mechanisms, require a specific tool installation height adjustment device 21 for the possibly to be performed tool bit installation height adjustment between the stationary mold support- or base-plate 2 and the mobile mold support plate 3. This tool installation adjustment device 21 is herein allocated to that side of the support plate 4 to which are also allocated the electromotor 18 for the drive of the toggle lever systems 7.

An electromotor 22 is also provided for driving the tool installation height adjustment device 21, which electromotor 22 sits am the drive support plate 4, for instance is flanged to same. It can drive on the one hand a spur wheel step down transmission 23 and on the other hand can be equipped with a holding brake 24, as this can be seen in FIG. 1. The spur wheel step down transmission 23 has an output pinion 25, which again meshes with a spur wheel mounted on the drive support plate 4. Herein this spur wheel 26 is formed by ring 27, which is supported at the external side of the drive support plate 4 by flanged- or guidance-rollers 28 engaging at its internal circumference, wherein only one such flanged- or guidance roller can be seen in FIG. 1. This roller engages herein at the internal circumference of the ring 27 at a point lying opposite to the output pinion 25, in order to assure the reciprocal drive engagement. At least two such additional flanged- or guide-rollers 28 cooperate, uniformly with the first flanged- or guide-roller 28, in an angularly offset manner with the internal circumference of the ring 28 or of the spur gear 26, as this is perceived clearly from FIG. 2 of the drawing. The spur gear 26 of the tool installation height adjustment device 21 configured as a ring 27 has not only an internal diameter, which is larger than the external contour of the electromotor 18 and the attachment aggregates sitting thereon. Rather the ring 27 with its external circumferential set of teeth 29 has also such a diameter, that it meshes simultaneously and continuously with four pinions 30 of which each one is again coupled to an adjustment nut 31. The adjustment nuts 31 are seated rotatably but axially nondisplaceably in the drive support plate 4 and are in permanent engagement with threads on the intermediate links 5, which establish the connection of the stationary mold support- or base plate 3 with the drive support plate 4 and maintain same.

By operating the electromotor 21 the spacing of the drive support plate 4 relative to the mold support- or base plate 2 of the closing unit 1 can be varied by means of the tool installation height adjustment device 21; this entails that, due to the toggle switch systems 7 located between the drive support plate 4 and the mobile mold support plate 3, an appropriate spacing change of the mobile mold support plate 3 from the stationary mold support- or base-plate 2 also mold support plate 3, an appropriate spacing change of the mobile mold support plate 3 from the stationary mold support- or base-plate 2 also occurs and that an adaptation to different installation heights of the mold tools 6 is possible in this manner.

It is also possible to influence the closing stress or tension of the molding tool 6 with the help of the tool installation height adjustment device 21, or in that shortly prior to achieving the stretched position of the toggle lever systems 7, used as force transmission mechanisms, the spacing of the drive support plate 4 from the stationary mold support- or base-plate 2 can still be slightly reduced.

It is seen from FIG. 1, that the flanged- or guidance-rollers 28 for the ring 27 comprise an external and an internal flanged ring, which fix the spur wheel 26 axially in its plane of rotation. It can also be seen from FIGS. 1 and 2 however, that on the one hand the electromotor 18 for actuating the toggle lever system 7 and on the other hand the tool installation height adjustment device 21 have a disposition at the external side of the drive support plate 4, which effectively avoid mutual impairment in the course of assembly, disassembly, maintenance and replacement.

Finally it can also be seen from FIG. 1, that equipping the mobile mold support plate 3 of the closing unit 1 with an ejector 32 is easily possible. Herein an electromotor 33 can also serve as a drive for the ejector 32, which motor actuates several threaded spindles 34, which on their part are in engagement with an ejector plate 35.

The ejector 32 can herein be configured as an independent unit, which can be allocated (also subsequently) to the mobile mold support plate 3 of any random closing unit 1.

What is claimed is:

1. A closing unit (1) for a mold tool (6) of an injection molding machines a stationary mold support plate (2), a movable mold support plate (3) whose spacing from the stationary mold support plate (2) can be varied by displacement thereof, a drive support plate (4) which is connected with the stationary mold support plate by traction links (5), wherein an electric motor (18) serves as an actuation drive for the movable mold mounting plate (3), whereby the electric motor repositions at least one toggle lever system (7) alternately through a threaded spindle (15) between a kinked position and a stretched position, the at least one toggle level system being installed between the drive support plate (4) and the mobile mold mounting plate (3), and wherein the mold tool (6) is held under closing stress between the two mold support plates (2 and 3) in the stretched position of the at least one toggle lever system (7), characterized in that, a liquid-cooled (19) servomotor (18) is provided as the electric motor, wherein the electric motor comprises a hollow shaft (17), inside of said shaft a threaded spindle (15) can be axially displaced by a nut (16), wherein the nut (16) engages at the at least one toggle lever system (7) in a non-rotatable manner thereto.

2. Closing unit according to claim 1, characterized in that the nut (16) allocated to the threaded spindle (15) inside of the drive support plate (4) is coupled with the hollow shaft (17) of the electric motor (18).

3. Closing unit according to claim 1, characterized in that the threaded spindle (15) is connected to a crosshead (14) engaging the at least one toggle lever system (7) so as to be non-rotatable with respect thereto.

4. Closing unit according to claim 1 and including a device for installation height adjustments allocated to the two mold support plates, characterized in that, an electromotor (22) is provided as a drive for the tool installation height adjustment device (21), said electromotor sitting on the drive support plate (4) while driving a spur wheel (26) also supported on the drive support plate (4), which spur wheel (26) meshing with pinions (30), wherein each pinion (30) is coupled with a respective nut (31) supported at the drive support plate (4) so as to be axially nondisplaceable but rotatable, each nut (31) being in engagement with a thread of respective traction links (5) provided between the stationary mold support relate (2) and the drive support plate (4).

5. Closing unit according to claim 4, characterized in that the electromotor (22) is equipped with a spur wheel transmission (23) as well as with a holding brake (24).

6. Closing unit according to claim 5, characterized in that the spur wheel (26) is formed by a ring (27), said upper wheel being supported at the drive support plate (4) by guidance-rollers (28) engaging an internal circumference of said ring.

7. Closing unit according to claim 1, characterized in that the taction links (5) are formed as struts, the struts providing slide guidance for the movable mold support plate (3).

8. Closing unit according to claim 1, characterized in that the electric motor comprises an AC-synchronous motor.

9. Closing unit according to claim 8, characterized in that the AC-synchronous motor is a three-phase synchronous motor.

\* \* \* \* \*